Feb. 9, 1971 — C. R. LEA — 3,562,076

FLOORING WITH DECORATIVE FILLER

Filed March 3, 1967

INVENTOR.
CHARLES R. LEA
BY
Carpenter, Kinney & Boulter
ATTORNEYS

United States Patent Office 3,562,076
Patented Feb. 9, 1971

3,562,076
FLOORING WITH DECORATIVE FILLER
Charles R. Lea, White Bear Lake, Minn., assignor to Minnesota Mining and Manufacturing Company, St. Paul, Minn., a corporation of Delaware
Filed Mar. 3, 1967, Ser. No. 620,325
Int. Cl. B32b 19/02; B44f 9/04; F04f 15/17
U.S. Cl. 161—5                                    7 Claims

ABSTRACT OF THE DISCLOSURE

Organic polymeric flooring, preferably formed from a transparent epoxy, polyurethane, or polyester polymer containing as a decorative filler granules formed from a translucent base rock having an insoluble pigmented ceramic coating which after wear of the coating from the tops of the granules remains color stable.

---

This invention relates to improved polymeric resin flooring containing colored decorative inserts.

Resin flooring, particularly cured-in-situ seamless flooring formed from polymeric resins, has recently come into wide usage. Such flooring may be formed from a clear or pigmented resin which in either event may contain decorative inserts such as metal, plastic, or ceramic chips or flakes. One commonly used decorative filler for such flooring is conventional roofing granules which consist of a base mineral granule coated with a colored insoluble ceramic coating such as an insolubilized alkali metal silicate. Such fillers impart a decorative color and character to the flooring and improve the dimensional stability thereof. Such fillers also reduce the resin raw material costs.

The use of conventional roofing granules over an extended wear period in the floors has disclosed a serious shortcoming for the use of such in seamless resin flooring. Roofing granules are made with a dark colored base rock, such as argillite or nepheline syenite overcoated with the colored coating. Such dark base rocks are required in the roofing granules used to surface asphalt-coated roofing in order to prevent ultraviolet light transmission which would degrade the asphalt beneath the granules, causing an unwanted detrimental loss of adhesion to the granules when the roofing is exposed to sunlight. When these granules are used as a flooring aggregate, however, the color coating may be abraded or worn off in heavy traffic areas, exposing the dark base rock. This results in a dark mottled-appearing floor in areas of heavy traffic.

The present invention overcomes the shortcoming for use in flooring of conventional roofing granules and provides a resinous flooring having improved decorative inserts. In accordance with the present invention, light colored, translucent or transparent base rock having a colored coating thereover is used in the flooring. As the floors of this invention are abraded or worn out to expose the base rock on the granules, the flooring not only does not darken, but there is a beneficial tendency of the floors to retain the original coloring by virtue of transmission of the color characteristics from the embedded side of the granules through the transparent or translucent rock. Thus the wear life of the floors, without the sacrifice of the color sharpness, is greatly increased. The dimensional stability, chemical resistance, and color stability of the floors are greatly improved by the use of such granules as compared to, for example, plastic chips used as inserts. The decorative effects provided by the granules of this invention are the most substantial when the granules are used in flooring formed from transparent resins, and such resins are thus preferred.

Figure 1:
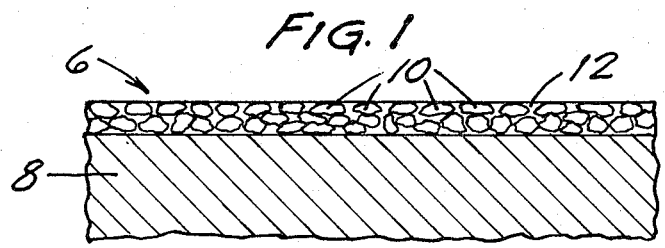
Figure 2:
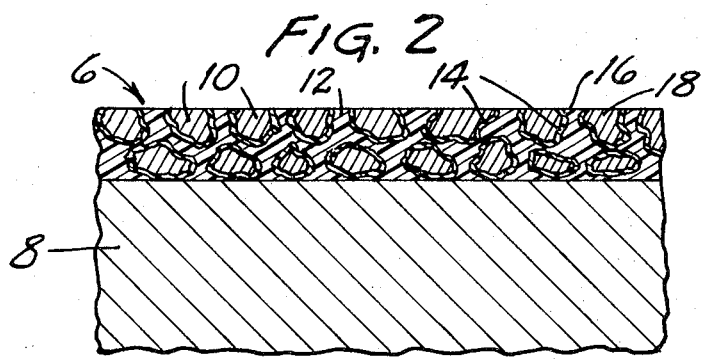

Further objects and advantages of the invention will be apparent from the detailed description and drawings wherein:

FIG. 1 is an enlarged cross sectional view of a floor of this invention after installation, and FIG. 2 is an enlarged cross sectional view of a floor of this invention after a period of wear.

Referring more particularly to FIG. 1, there is seen a floor 6 self-adhered to flooring substrate 8. Floor 6 contains as a discontinuous phase granules 10 distributed homogeneously throughout a continuous polymeric resin phase 12.

In FIG. 2 is shown the color coating 14 on granule 10 which are worn away at top surfaces 16 after a period of wear, exposing the base mineral 18 from which the granules were formed. Since mineral 18 is translucent, the color of coating 14 is seen through the eroded surface 16 of the granules.

The resin from which the flooring is made can be any conventional resin used for flooring, and is preferably a transparent durable crosslinked resin such as epoxy, polyurethane, or polyester resin. The preparation and formulation of the resins, as well as the application thereof to flooring, is well known to those skilled in the art.

The flooring is typically prepared by spreading a base polymer layer which may be either pigmented or clear, followed by a spray or sprinkling of color coated mineral granules. A final coating of resin is then applied by flooring, spraying, etc. An alternative method involves mixing the resin and the granular material and troweling or mechanically spreading the mixture. This layer is then generally finished with an additional coating of clear resin. Other methods of application of the flooring will be apparent to those skilled in the art.

The granules are generally mixed into the resin in a ratio of about 1 part granules to 1 part resin to about 9 parts granules to 1 part resin by weight. By using the larger amounts of granules in the resin, the wear resistance and load bearing ability of the floors is improved, as is desirable in industrial areas, for example where heavy machinery is used on the floor. If a ratio much greater than about 9 to 1 is used, the mixtures tend to be resin starved and applied only with great difficulty. The smaller amounts of granule filler are desirable in some applications where improved chemical resistance of the floor is desired. If only a sparse loading of decorative filler is wanted an even smaller loading of granules than 1:1 may be used.

The preferred size for the granules used in accordance with this invention is below 2 mm. and preferably —10 +35 mesh Tyler (0.4 to 1.7 mm.). Coarser granules may be used, but tend to introduce difficulty in troweling and result in thicker floors than generally desired. Finer granules may be used, particularly if uniform appearing floors are desired. However, granules in the preferred size range have been found to give the most pleasing texture and attractive appearance to the floor. Various textured effects and contrasts can also be provided by mixing granules of different colors. Similarly, contrasting pigments can be added to the polymeric resin itself.

The preferred translucent base mineral for use in practicing the invention is quartzite. Other suitable minerals include other varieties of quartz and translucent aplite, feldspars and zircon.

The base mineral granules are prepared and coated in accordance with the conventional techniques, for example, those shown in U.S. Pat. 2,379,358 (Jewett) issued June 26, 1945, or U.S. Pat. 2,614,051 (Buzzell et al.) issued Oct 14, 1952.

It has been further discovered that the granules of this invention may be further treated with a water soluble polymer, such as polyvinyl alcohol, which has been found to markedly improve the free flowing character of the granules. Such treatment has also been found to improve the trowelability of resins containing the granules as a decorative filler. Since the resin-granule mixture is more readily trowelable, the floors produced are more even and better appearing. The resin is preferably applied to the coated granules simply in the form of an aqueous solution. Such a solution is advantageously applied to the granules as a dilute solution in the cooling water conventionally used to cool the granules back to room temperature after firing.

The invention will be further illustrated by the accompanying examples, in which all parts are given by weight unless otherwise indicated.

Example I

A coating composition is prepared in accordance with the following formulation:

| | Parts |
|---|---|
| Chrome oxide | 10.0 |
| Titanium dioxide | 2.0 |
| Dover clay | 20.0 |
| "K" Brand aqueous sodium silicate (42.9% solids) ($Na_2O:SiO_2$ ratio equals 1:2.9) | 37.0 |
| Water | 10.0 |

The ingredients of the coating composition are first mixed together, following which the composition is applied to 2000 parts of #11 grade (—10 +35 mesh) quartzite granules in a tumbling barrel-type mixer. The coating is then predried, by passing air through the mixer, until the coated granules are free flowing, all in accordance with conventional practice, after which the granules are transferred to a rotary kiln and fired at 900° F., dwell time in the kiln being about 20 minutes. The granules are then cooled in a rotary cooler.

The granules are mixed into a 100% solids epoxy resin (H. B. Fuller "Resiweld BC027") in the ratio of 5 parts by weight granules per 1 part of resin. The resin granule mixture is troweled to a thickness of, for example, about one-eighth inch onto a clean floor substrate previously coated with a penetrating sealer. Floors were also made from two parts polyurethane and polyester resins by similarly mixing in the granules and troweling the resins onto a floor.

Example II

A precoating coating composition is prepared in accordance with the following formulation:

| | Parts |
|---|---|
| Titanium dioxide | 8.0 |
| Kaolin | 30.0 |
| "K" Brand aqueous sodium silicate (42.9% solids) | 45.0 |
| Water | 10.0 |

The ingredients of the coating composition are mixed and applied to quartzite granules as in Example I and fired to 900° F. in a rotary kiln. The granules are then cooled in a rotary cooler.

In the meantime a second coating composition is prepared by mixing ingredients in accordance with the following formulation:

| | Parts |
|---|---|
| Titanium dioxide | 20.0 |
| Kaolin | 30.0 |
| "K" Brand aqueous sodium silicate (42.9% solids) | 55.0 |
| Water | 15.0 |

The second coating composition is applied to the cooled precoated granules by similar procedures as followed in the application in Example I, following which the granules are again fired in a rotary kiln at 900° F. The granules are then cooled. The granules are incorporated into floors as in Example I.

Example III

A 6% solids aqueous solution of polyvinyl alcohol was prepared by mixing 6 parts polyvinyl alcohol resin in 100 parts by weight cold water and heating gradually to about 195° F. until a clear solution was formed. This solution was added to the water fed into the rotary cooler of Examples I and II at a rate sufficient to provide 1 part polyvinyl alcohol solids per 2000 parts granules. The dried granules thus coated were notably more free flowing than the uncoated granules; polyurethane, epoxy, polyester and similar resins containing the coated granules could be much more readily troweled than could the same resins containing uncoated granules. The granules are incorporated into resins as in Example I to provide mixtures of improved trowelability.

What is claimed is:
1. A durable decorative floor comprising a flooring substrate having adhered thereto a continuous, seamless, applied-in-situ layer of a transparent synthetic organic polymer having homogeneously distributed therethrough, as a discontinuous phase, translucent mineral granules less than 2 mm. in size having a color coating thereon, said color coating comprising a pigmented insoluble ceramic composition.

2. Flooring according to claim 1 wherein said polymer is selected from epoxy, polyurethane, and polyester resins.

3. Flooring according to claim 1 wherein said translucent mineral granules comprise quartzite.

4. Flooring according to claim 1 wherein said ceramic composition is an insolubilized alkali metal silicate.

5. Flooring according to claim 1 wherein said translucent mineral granules include granules having average diameters of 0.4–1.7 mm.

6. Flooring according to claim 1 wherein said coated granules have a further coating of polyvinyl alcohol on the surface thereof.

7. Flooring according to claim 8 wherein said continuous, seamless, applied-in-situ layer further contains a pigment contrasting in color with respect to the said color coating on said translucent mineral granules.

References Cited

UNITED STATES PATENTS

| 1,486,208 | 3/1924 | Weber | 264—77 |
|---|---|---|---|
| 2,776,914 | 1/1957 | Faulwetter | 117—100 |
| 3,174,977 | 3/1965 | Hoiberg et al. | 94—3XR |
| 3,445,275 | 5/1969 | Bogart | 260—29.6(B) |
| 2,614,051 | 10/1952 | Buzzell et al. | 117—27 |
| 2,695,851 | 11/1954 | Lodge | 117—27 |
| 3,070,474 | 12/1962 | Smith | 161—162X |
| 3,099,574 | 7/1963 | Bernier | 117—27X |
| 3,171,772 | 3/1965 | Lomar et al. | 161—162X |
| 3,208,871 | 9/1965 | Langseth et al. | 117—27 |
| 3,210,208 | 10/1965 | Grass et al. | 117—100X |
| 3,344,011 | 9/1967 | Goozner | 161—162X |
| 3,446,644 | 5/1969 | Murphy et al. | 117—25 |

DOUGLAS J. DRUMMOND, Primary Examiner

G. W. MOXON II, Assistant Examiner

U.S. Cl. X.R.

94—3; 117—27, 100; 161—162, 168

UNITED STATES PATENT OFFICE
CERTIFICATE OF CORRECTION

Patent No. 3,562,076   Dated February 9, 1971

Inventor(s) Charles R. Lea

It is certified that error appears in the above-identified patent and that said Letters Patent are hereby corrected as shown below:

In Column 2, line 28, change "floor-" to -- flood- -- ;

In Column 4, line 43, change "according to claim 8" to -- according to claim 1 -- .

Signed and sealed this 22nd day of June 1971.

(SEAL)
Attest:

EDWARD M. FLETCHER, JR.
Attesting Officer

WILLIAM E. SCHUYLER, JR
Commissioner of Patents